US012681630B2

(12) United States Patent
Jiang et al.

(10) Patent No.: US 12,681,630 B2
(45) Date of Patent: Jul. 14, 2026

(54) PROCESSING METHOD AND APPARATUS, AND ELECTRONIC DEVICE FOR WINDOW MANAGEMENT IN SPLIT SCREEN

(71) Applicant: Lenovo (Beijing) Limited, Beijing (CN)

(72) Inventors: Yiming Jiang, Beijing (CN); Xiaoyan Shi, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 191 days.

(21) Appl. No.: 18/464,776

(22) Filed: Sep. 11, 2023

(65) Prior Publication Data

US 2024/0111406 A1     Apr. 4, 2024

(30) Foreign Application Priority Data

Sep. 30, 2022    (CN) .......................... 202211218003.3

(51) Int. Cl.
*G06F 3/0481*      (2022.01)
*G06F 3/04845*     (2022.01)
*G06F 3/04847*     (2022.01)

(52) U.S. Cl.
CPC ........ *G06F 3/04847* (2013.01); *G06F 3/0481* (2013.01); *G06F 3/04845* (2013.01); *G06F 2203/04803* (2013.01)

(58) Field of Classification Search
CPC .............. G06F 3/04847; G06F 3/0481; G06F 3/04845; G06F 2203/04803; G06F 3/0484; G06F 3/0486
See application file for complete search history.

(56) References Cited

U.S. PATENT DOCUMENTS

| | | | |
|---|---|---|---|
| 2013/0120447 A1* | 5/2013 | Kim ........................ | G06T 11/60 345/173 |
| 2015/0100914 A1* | 4/2015 | Guan .................... | G06F 3/0481 715/781 |
| 2022/0291794 A1* | 9/2022 | Bian ..................... | G06F 1/1652 |

* cited by examiner

*Primary Examiner* — Rinna Yi
(74) *Attorney, Agent, or Firm* — ANOVA LAW GROUP, PLLC

(57) ABSTRACT

A processing method includes displaying at least two windows in at least two split-screen regions based on a split-screen command, obtaining an input operation for a target window in the at least two windows, determining adjustment parameters of a correlation window related to the target window and among the at least two windows in response to the input operation, and adjusting the correlation window based on the adjustment parameters. The region of each of the at least two windows corresponds to a split-screen region of the at least two split-screen regions. Each of the at least two windows includes an interactive interface. The correlation window before the correlation window adjustment is different from the correlation window after the correlation window adjustment.

17 Claims, 4 Drawing Sheets

S101 — Displaying at least two windows in at least two split-screen regions based on a split-screen command S102 — Obtaining an input operation for a target window in the at least two windows S103 — In response to the input operation, determining adjustment parameters of a correlation window S104 — Adjusting the correlation window based on the adjustment parameters

S101

Displaying at least two windows in at least two split-screen regions based on a split-screen command

S102

Obtaining an input operation for a target window in the at least two windows

S103

In response to the input operation, determining adjustment parameters of a correlation window

S104

Adjusting the correlation window based on the adjustment parameters

Displaying at least two windows in at least two split-screen regions based on a split-screen command                      S201

Obtaining a dragging operation for a target window                      S202

Determining adjustment parameters of a correlation window related to the target window                      S203

Adjusting the correlation window based on the adjustment parameters                      S204

FIG. 3

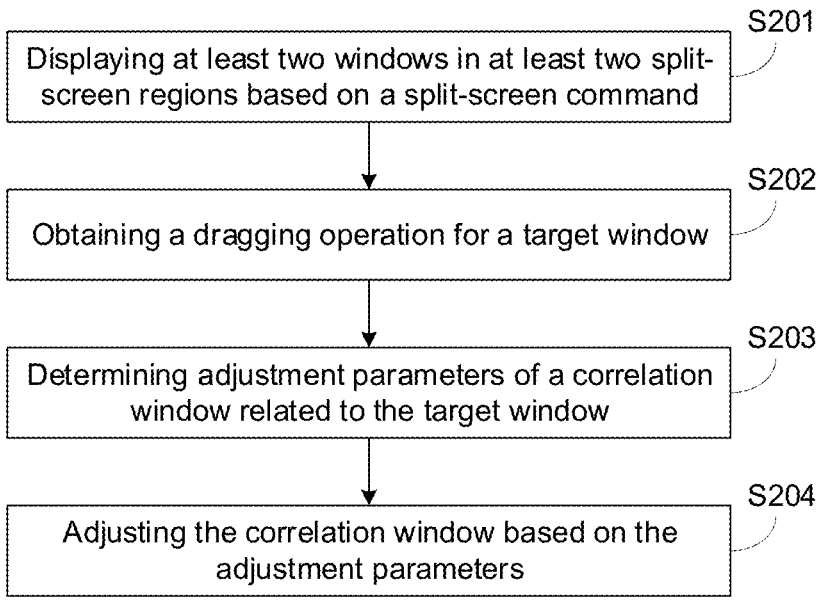

Swap of interactive interfaces of window M and window S

FIG. 4

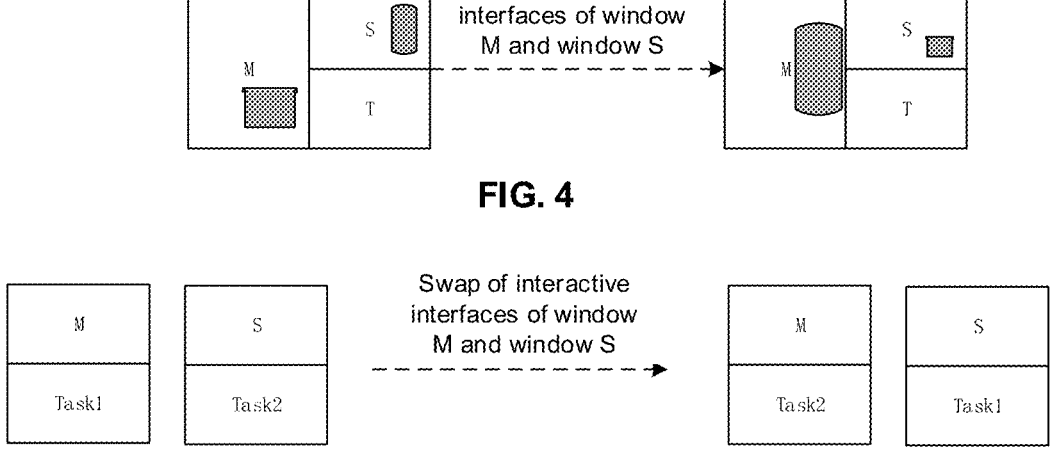

Swap of interactive interfaces of window M and window S

FIG. 5

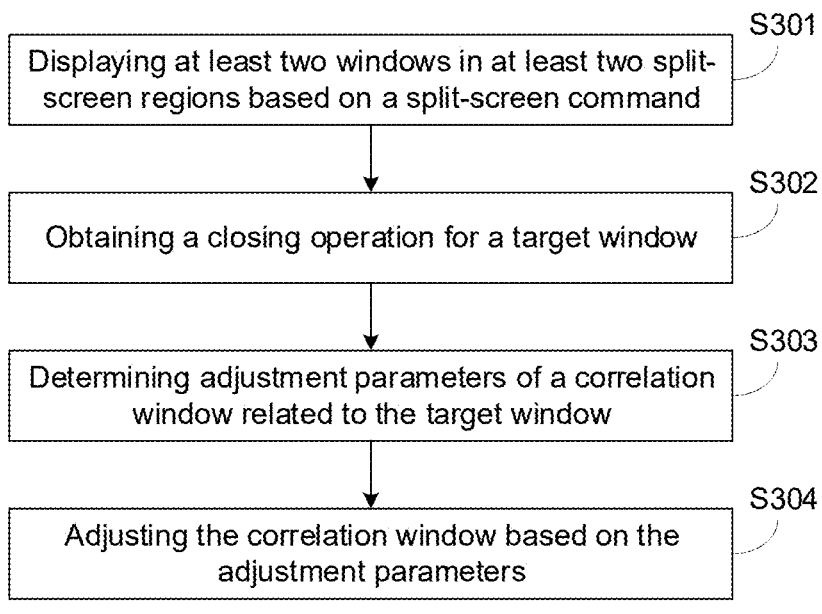

Displaying at least two windows in at least two split-screen regions based on a split-screen command — S301

Obtaining a closing operation for a target window — S302

Determining adjustment parameters of a correlation window related to the target window — S303

Adjusting the correlation window based on the adjustment parameters — S304

FIG. 6

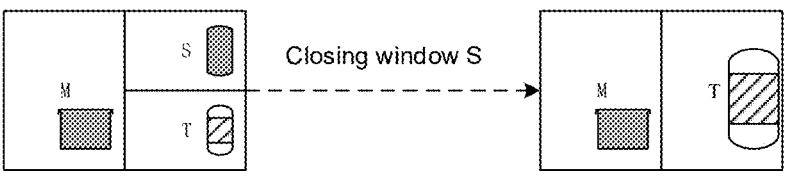

Closing window S

FIG. 7

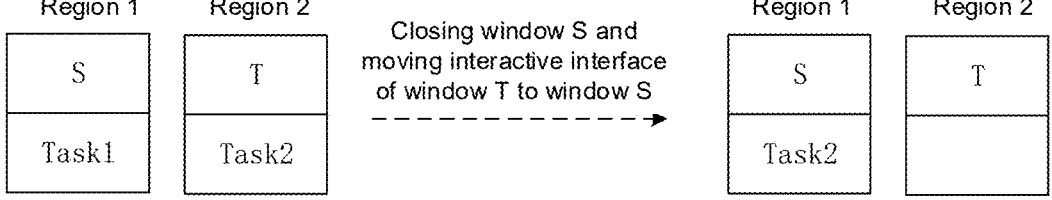

Region 1     Region 2

S

Task1

T

Task2

Closing window S and moving interactive interface of window T to window S

Region 1     Region 2

S

Task2

PROCESSING METHOD AND APPARATUS, AND ELECTRONIC DEVICE FOR WINDOW MANAGEMENT IN SPLIT SCREEN

CROSS-REFERENCE TO RELATED APPLICATION

This application claims the priority of Chinese Patent Application No. 202211218003.3, filed on Sep. 30, 2022, the content of which is incorporated herein by reference in its entirety.

TECHNICAL FIELD

The present disclosure generally relates to the field of screen display technology and, more particularly, relates to a processing method and apparatus, electronic device, and non-transitory computer readable storage medium.

BACKGROUND

With the iteration and development of electronic products, the screen size of mobile devices is getting larger. Large-screen devices are an important direction for the development of mobile devices. As a multi-window form, split screen can play an important role on large-screen devices. However, in related technologies, after a split-screen mode is triggered and windows of applications are specified for respective split-screen regions, the windows and split-screen regions are fixed. In order to change a window in a split-screen region, the split-screen mode needs to be re-started and applications need to be re-selected, which degrade the practicality and usage efficiency of mobile devices.

SUMMARY

One aspect of the present disclosure provides a processing method. The processing method includes displaying at least two windows in at least two split-screen regions based on a split-screen command, obtaining an input operation for a target window in the at least two windows, determining adjustment parameters of a correlation window related to the target window and among the at least two windows in response to the input operation, and adjusting the correlation window based on the adjustment parameters. The region of each of the at least two windows corresponds to a split-screen region of the at least two split-screen regions. Each of the at least two windows includes an interactive interface. The correlation window before the correlation window adjustment is different from the correlation window after the correlation window adjustment.

Another aspect of the present disclosure provides a processing apparatus. The processing apparatus includes a window manager configured to display at least two windows in at least two split-screen regions based on a split-screen command, a region of each of the at least two windows corresponding to a split-screen region of the at least two split-screen regions, and each of the at least two windows including an interactive interface; a split-screen controller configured to obtain an input operation for a target window in the at least two windows; a window organizer controller configured to determine adjustment parameters of a correlation window related to the target window and among the at least two windows in respond to the input operation; and a task organizer controller configured to adjust the correlation window based on the adjustment parameters, the correlation window before correlation window adjustment being different from the correlation window after the correlation window adjustment.

Another aspect of the present disclosure provides an electronic device. The electronic device includes one or more processors; and a memory coupled to the one or more processors and storing computer programs that, when being executed, cause the one or more processors to perform displaying at least two windows in at least two split-screen regions based on a split-screen command, obtaining an input operation for a target window in the at least two windows, determining adjustment parameters of a correlation window related to the target window and among the at least two windows in response to the input operation, and adjusting the correlation window based on the adjustment parameters. The region of each of the at least two windows corresponds to a split-screen region of the at least two split-screen regions. Each of the at least two windows includes an interactive interface. The correlation window before the correlation window adjustment is different from the correlation window after the correlation window adjustment.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 3 illustrates a schematic flow chart of another processing method according to various embodiments of the present disclosure;

FIG. 4 illustrates an exemplary processing method according to various embodiments of the present disclosure;

FIG. 5 illustrates another exemplary method that involves adjustment parameters according to various embodiments of the present disclosure;

FIG. 6 illustrates a schematic flow chart of another processing method according to various embodiments of the present disclosure;

FIG. 7 illustrates another exemplary processing method according to various embodiments of the present disclosure;

FIG. 8 illustrates another exemplary method that involves adjustment parameters according to various embodiments of the present disclosure;

DETAILED DESCRIPTION

Figure 1:
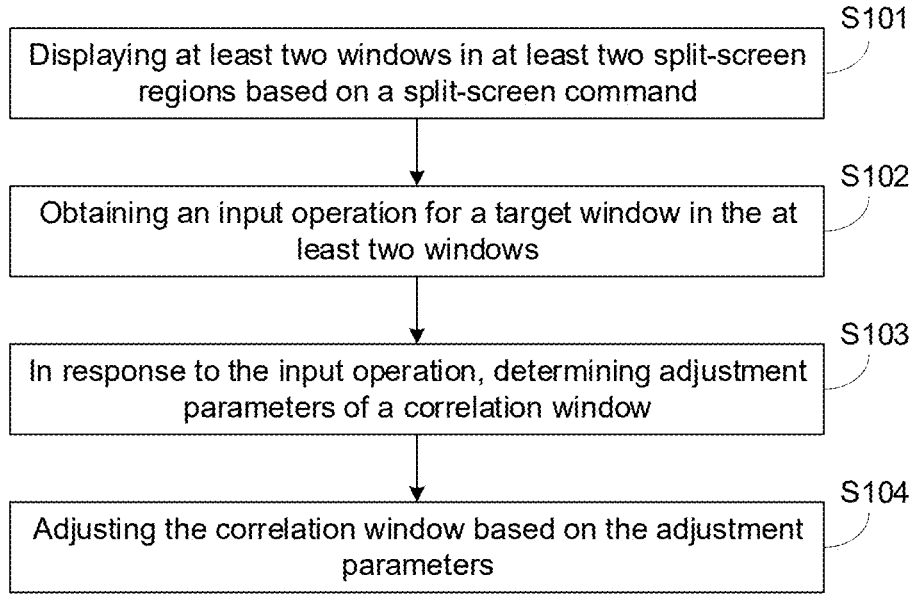
FIG. 1 illustrates a schematic flow chart of a processing method according to various embodiments of the present disclosure.

Reference will now be made in detail to exemplary embodiments of the disclosure, which are illustrated in the accompanying drawings. Wherever possible, the same reference numbers will be used throughout the drawings to refer to the same or like parts.

The present disclosure provides processing methods and apparatus. An exemplary processing method includes: displaying at least two windows in at least two split-screen regions based on a split-screen command, wherein the region of each of the at least two windows corresponds to a split-screen region of the at least two split-screen regions, and each of the at least two windows includes an interactive interface; obtaining an input operation for a target window in the at least two windows; in response to the input operation, determining adjustment parameters of a correlation window related to the target window and among the at least two windows; and adjusting the correlation window based on the adjustment parameters, wherein the correlation window before the adjustment is different from the correlation window after the adjustment.

In one embodiment, the adjustment parameters at least include the area size of the correlation window and the interactive interface included in the correlation window.

In one embodiment, determining the adjustment parameters of the correlation window related to the target window among the at least two windows in response to the input operation includes in response to the input operation being closing the target window, determining the area size of the correlation window.

In one embodiment, determining the area size of the correlation window includes obtaining the area size of the target window and the original area size of the correlation window, and determining that the area size of the correlation window is the combination of the area size of the target window and the original area size of the correlation window.

In one embodiment, determining the adjustment parameters of the correlation window related to the target window among the at least two windows in response to the input operation further includes in response to the input operation being dragging the target window, determining the interactive interface included in the correlation window.

In one embodiment, determining the interactive interface included in the correlation window includes confirming a target task corresponding to the target window, and determining that the interactive interface corresponding to the target task is the interactive interface of the correlation window.

The processing method further includes in response to the input operation being dragging the target window, displaying at least two split-screen regions, and in response to dragging the target window to a target split-screen region, determining that the window corresponding to the target split-screen region is the correlation window.

According to another aspect of the present disclosure, a processing apparatus includes a window manager, a split-screen controller, a window organizer controller, and a task organizer controller. The window manager is configured to display at least two windows in at least two split-screen regions based on a split-screen command. The region of each of the at least two windows corresponds to a split-screen region of the at least two split-screen regions. Each of the at least two windows includes an interactive interface. The split-screen controller is configured to obtain an input operation for a target window in the at least two windows. The window organizer controller is configured to determine adjustment parameters of a correlation window related to the target window and among the at least two windows in response to the input operation. The task organizer controller is configured to adjust the correlation window based on the adjustment parameters. The correlation window before the adjustment is different from the correlation window after the adjustment. The adjustment parameters at least include the area size of the correlation window, and the interactive interface included in the correlation window. The window organizer controller is further configured to determine the area size of the correlation window in response to the input operation being closing the target window.

It should be understood that what is described is not intended to identify key or important features of the embodiments of the present disclosure, nor is it intended to limit the scope of the present disclosure. Other features of the present disclosure will become easily understood through the following descriptions.

Figure 2:
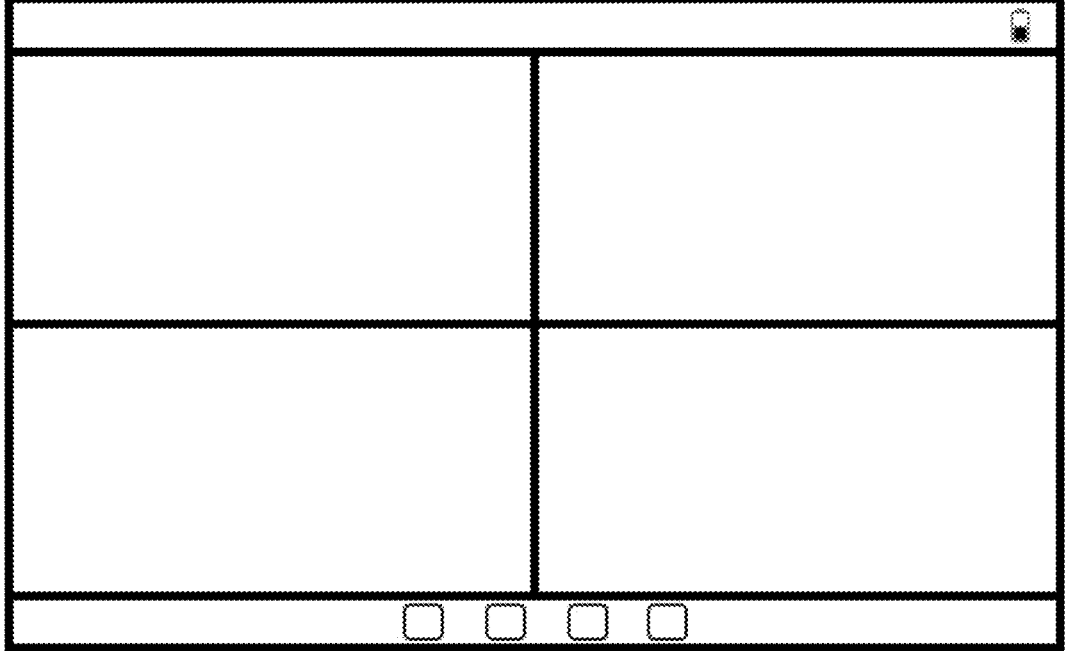
FIG. 2 illustrates a diagram of an exemplary display screen according to various embodiments of the present disclosure.

FIGS. 1 and 2 show a schematic flow chart of a processing method and a diagram of an exemplary display screen according to the present disclosure. At S101, based on a split-screen command, at least two windows are displayed in at least two split-screen regions. In some embodiments, a processing apparatus may include a window manager. Based on certain split-screen technologies, the window manager splits the screen of a mobile device after receiving the split-screen command, and displays at least two windows in at least two split-screen regions. The region of each of the at least two windows corresponds to a split-screen region of the at least two split-screen regions. Each of the at least two windows includes an interactive interface. As such, the region of any window of the at least two windows corresponds to a split-screen region, and each window includes or displays an interactive interface.

As shown in FIG. 2, the window manager displays four windows in four split-screen regions respectively based on the split-screen command. The region of each window corresponds to a split-screen region, and each window includes an interactive interface.

At S102, an input operation for a target window in the at least two windows is obtained. In some embodiments, the processing apparatus may include a split-screen controller. The split-screen controller obtains the input operation for the target window in the at least two windows. The input operation may be an operation for a window, including at least one of closing the target window, dragging the target window, and adding a new window. In addition, the input operation may also include an operation for the interactive interface, such as sliding up, sliding down, clicking on a link, etc.

In some cases, if the input operation is an operation for a window, the split-screen controller may send the input operation to the window manager.

In some cases, the operation for the split-screen window is based on a divider between two windows. For example, the divider may be dragged to adjust the sizes of two windows, or dragged to the top or bottom of a screen to close a window. When the divider is dragged, both windows are affected at the same time. That is, the operation of dragging the divider is for the two windows. However, in some embodiments of the present disclosure, an input operation may be arranged only for one target window, or only for a correlation window related to the target window, while the input operation does not affect other windows on the screen.

At S103, in response to the input operation, adjustment parameters of the correlation window are determined. The correlation window is related to the target window and among the at least two windows. In some embodiments, the window manager determines the adjustment parameters of the correlation window in response to the input operation. The correlation window corresponds to the split-screen mode with respect to the split-screen command. Optionally, the window manager may use the split-screen mode and/or the input operation to determine the correlation window.

In some cases, in response to that the input operation is to close the target window, the correlation window is a window on the same screen as the target window. For example, when two windows are displayed in two split-screen regions (i.e., 2-split screen mode) based on a split-screen command at S101, the correlation window and target window are on the same screen, and the correlation window is the other window besides the target window. When at least three windows are displayed in at least three split-screen regions (e.g., 3-split screen mode, 4-split screen mode, or multi-split screen mode) based on a split-screen command, the correlation window may be any window that has the same size as the target window and shares a common edge with the target window.

Optionally, in response to that the input operation is to drag the target window, the correlation window is a window corresponding to a split-screen region where the end point of the input operation is located. For example, assuming at least two windows are displayed in at least two split-screen regions (e.g., 2-split screen mode, 3-split screen mode, or multi-split screen mode) based on a split-screen instruction at S101. When the start point of the input operation is in a split-screen region of window 1, and the end point is in a split-screen region of window 2, window 1 is the correlation window.

Optionally, in response to that the input operation is to add a new window, the correlation window is the target window, and/or, at least two windows after the target window is split.

In some embodiments, the adjustment parameters may include the area size of the correlation window and the interactive interface included in the correlation window.

Optionally, in response to that the input operation is to close the target window, the window manager determines the area size of the correlation window. For example, the window manager may obtain the area size of the target window and the original area size of the correlation window. The window manager may also determine that the area size of the correlation window is the combination of the area size of the target window and the original area size of the correlation window.

Optionally, in response to that the input operation is to drag the target window, the window manager may determine the interactive interface included in the correlation window. For example, the window manager may determine a target task corresponding to the target window, and the interactive interface corresponding to the target task is the interactive interface of the correlation window.

Further, in response to that the input operation is to drag the target window, the window manager may show at least two split-screen regions. In response to that the input operation is to drag the target window to a target split-screen region, the window manager may determine the window corresponding to the target split-screen region is the correlation window. The target split-screen region is the split-screen region corresponding to the end point of the drag operation. Optionally, the window manager may determine the adjustment parameters of the target window. The adjustment parameters of the target window may include the area size and interactive interface of the target window. The window manager confirms that the area size of the target window is the original area size of the correlation window, and confirms that the interactive interface of the target window is the interactive interface of the correlation window.

Further, in response to that the input operation is to add a new window, the window manager may confirm the area size of the correlation window. For example, the window manager may divide the target window based on the input operation. The window manager may also confirm that the area size of the correlation window is the area size of at least two regions after the target window is divided.

At S104, the correlation window is adjusted based on the adjustment parameters. In some embodiments, a task organizer controller adjusts the correlation window based on the adjustment parameters. On the display screen of the mobile device, the task organizer controller may display the correlation window and/or windows other than the target window and correlation window.

As illustrated above, the present disclosure provides embodiments of the processing method. At a mobile device with a split screen, effective management may be implemented for windows that may be further split. The efficiency is improved. When a window is closed after screen splitting, windows in other split-screen regions may remain unchanged in the corresponding regions. By operations at a target window occupying an allocated region (e.g., closing window, swapping windows, etc.), and certain control of the corresponding correlation window, more efficient use is achieved. Compared to that the interactive interface of a window after screen splitting or a window after screen splitting cannot interact with other split-screen regions, and the split-screen mode has to be re-triggered and split-screen regions have to be re-specified, embodiments of the present disclosure provide operations at a target window occupying an allocated region (e.g., closing window, swapping windows, etc.), and certain control of the corresponding correlation window, and improve the use and efficiency.

Further, in the embodiments of the present disclosure, the split screen is not limited to 2-split screens and 3-split screens, and there may be more screen splitting modes.

FIGS. 3, 4, and 5 show a schematic flow chart of a processing method and diagrams of exemplary processing methods according to the present disclosure. At S201, based on a split-screen command, at least two windows are displayed in at least two split-screen regions at a mobile device. In some embodiments, a processing apparatus may include a window manager. Based on certain split-screen technologies, the window manager splits the display screen of the mobile device after receiving the split-screen command, displaying at least two windows in at least two split-screen regions. The region of each of the at least two windows corresponds to a split-screen region of the at least two split-screen regions. Each of the at least two windows includes an interactive interface. As such, the region of any window of the at least two windows corresponds to a split-screen region, and each window includes or displays an interactive interface.

At S202, an input operation for dragging a target window (i.e., a drag operation) is obtained. In some embodiments, the processing apparatus may further include a split-screen controller. The split-screen controller obtains the drag operation for dragging the target window and/or sends the drag operation to the window manager. Optionally, the processing apparatus may also confirm a correlation window corresponding to the target window.

In some cases, the correlation window is a window corresponding to a split-screen region where the start point of the drag operation is located and/or a window corresponding to a target split-screen region where the end point is located. For example, the split-screen command based on S201 may display at least two windows in at least two split-screen regions. The start point of the drag operation is the split-screen region where window 1 is located, and the end point is the target split-screen region where window 2 is located. Then, window 2 is the correlation window.

At S203, adjustment parameters for the correlation window related to the target window are determined. In some embodiments, the adjustment parameters may include the area size and interactive interface of the correlation window. The drag operation for the target window is performed to swap the positions of the target window and correlation window (visually swapping the interactive interfaces corresponding to the two windows to conduct a swap operation).

In some embodiments, the window manager may determine the area size of the correlation window and/or the area size of the target window. Optionally, the window manager may confirm that the area size of the correlation window is the area size of the target window, and that the area size of the target window is the area size of the correlation window.

In some embodiments, after receiving the drag operation, the window manager may also establish a subtask. The subtask may include adjusting the boundaries of the target window and the correlation window.

As shown in FIG. 4, a drag operation is to drag window M to the position of window S. Then window M is the target window. Assuming the region where window M is located is the first split-screen region (that is, the region located in the left half of the screen), and the region where window S is located is the target split-screen region (that is, the region located on the upper right of the screen). The positions and sizes of the first split-screen region and the target split-screen region relative to the display screen of the mobile device remain unchanged. Further, the window manager may confirm that the area size of the target window (window M) is the original area size of the correlation window (window S) (that is, the area size corresponding to the upper right region of the screen). Further, the window manager may establish a subtask to adjust the boundaries of the target window and correlation window to the boundaries after the drag operation is performed.

In some embodiments, the window manager may determine the interactive interface included in the correlation window. For example, the window manager may confirm a target task corresponding to the target window, and determine the interactive interface corresponding to the target task is the interactive interface of the correlation window. The window manager may also confirm a correlation task corresponding to the correlation window, and that the interactive interface corresponding to the correlation task is the interactive interface of the target window.

As shown in FIG. 4, the window manager may confirm that the correlation task after the adjustment of the correlation window (window S) is the target task of the target window. The window manager may also confirm the interactive interface corresponding to the correlation window is the interactive interface corresponding to the correlation task after the adjustment (that is, the interactive interface corresponding to the target window before receiving the drag operation), and the interactive interface of the correlation window is the original interactive interface of the target window.

At S204, the correlation window is adjusted based on the adjustment parameters. In some embodiments, a task organizer controller adjusts the correlation window based on the adjustment parameters. On the display screen of the mobile device, the task organizer controller may display the correlation window and/or windows other than the target window and correlation window.

FIG. 5 shows a schematic diagram involving adjusting parameters of the correlation window according to embodiments of the present disclosure. A task organizer controller may respectively establish a first task list (TaskListA) and a second task list (TaskListB) after receiving adjustment parameters and/or subtasks. The first task list records a target task corresponding to the target window, and the second task list records a correlation task corresponding to the correlation window. The task organizer controller moves the first task list to the correlation window, moves the second task list to the target window, and performs reparent operations, respectively. The first task list is associated with the original interactive interface corresponding to the target window (that is, the content displayed in the original interactive interface corresponding to the target window is related to the first task list). The second task list is associated with the original interactive interface corresponding to the correlation window (that is, the content displayed in the original interactive interface corresponding to the correlation window is related to the second task list).

As such, before receiving the drag operation, the target window executes the first task list, and the correlation window executes the second task list. After receiving the drag operation, the target window executes the second task list, and the correlation window executes the first task list. The positions and boundaries of the target window and correlation window relative to the display screen are not changed, only the corresponding interactive interfaces have been swapped.

In some embodiments, the task organizer controller may also update the display screen of the mobile device in response to the drag operation.

Thus, in multi-split screen (e.g., at least 3-split screen) cases, when corresponding interactive interfaces of two windows are swapped according to a drag operation, the sizes of all windows of the multi-split screen are not affected, and the interactive interfaces corresponding to the dragged and swapped windows are also not affected. It improves the usability of the split-screen and windows in the split-screen regions, making the interaction more efficient.

FIGS. 6, 7, and 8 show a schematic flow chart of a processing method and diagrams of exemplary processing methods according to various embodiments of the present disclosure. At S301, based on a split-screen command, at least two windows are displayed in at least two split-screen regions at a mobile device. In some embodiments, a processing apparatus may include a window manager. Based on certain split-screen technologies, the window manager splits the display screen of the mobile device after receiving the split-screen command, displaying at least two windows in at least two split-screen regions. The region of each of the at least two windows corresponds to a split-screen region of the at least two split-screen regions. Each of the at least two windows includes an interactive interface. As such, the region of any window of the at least two windows corresponds to a split-screen region, and each window includes or displays an interactive interface.

At S302, an input operation for closing a target window (i.e., a closing operation) is obtained. In some embodiments, the processing apparatus may further include a split-screen controller. The split-screen controller obtains the closing operation for closing a target window and/or sends the closing operation to the window manager. Optionally, the processing apparatus may also confirm a correlation window corresponding to the target window.

In some cases, the correlation window is a window in the same sub-screen as the target window. For example, based on the split-screen command at S301, two windows may be displayed in two split-screen regions. Then, the correlation window and the target window are on the same screen. The correlation window is another window other than the target window. Alternatively, when at least three windows are displayed in at least three split-screen regions based on a split-screen instruction, the correlation window may be a window that has the same dimensions (or sizes) as the target window and shares a common edge with the target window.

As shown in FIG. 4, if window S is the target window, its corresponding correlation window is window T that has the same size as window S and a common edge with window S.

At S303, adjustment parameters for the correlation window related to the target window are determined. In some embodiments, the adjustment parameters may include the area size and interactive interface of the correlation window. The closing operation for the target window is performed to close the interactive interface displayed in the target window, and adjust the size of the interactive interface displayed in the correlation window to the sum of the target window and the correlation window.

In some embodiments, the window manager may determine the area size of the correlation window. Optionally, the window manager may obtain the area size of the target window and the original area size of the correlation window, and determining that the area size of the correlation window is the combination of the area size of the target window and the original area size of the correlation window.

In some embodiments, after receiving the closing operation, the window manager may also establish a subtask. The subtask may include removing the target window. As shown in FIG. 7, when a closing operation closes window S, window S is the target window, and window T is the correlation window corresponding to window S. Further, the window manager may confirm that the area size of the correlation window (window T) is the combination of the area size of the target window (window S) and the original area size of the correlation window (window T).

In some embodiments, the window manager determines that the interactive interface included in the correlation window is the original interactive interface of the correlation window, but the displayed content may be adaptively adjusted according to the adjusted area size of the correlation window (e.g., more content may be displayed than that displayed before the target window is closed).

At S304, the correlation window is adjusted based on the adjustment parameters. In some embodiments, a task organizer controller adjusts the correlation window based on the adjustment parameters. On the display screen of the mobile device, the task organizer controller may display the correlation window and/or windows other than the target window and correlation window.

As shown in FIG. 8, window S is the target window and window T is the correlation window corresponding to window S. An operation is performed to close window S and move the interactive interface of window T to window S. Parameters of the correlation window are adjusted.

In some cases, after receiving adjustment parameters and/or subtasks, the task organizer controller may close a task list corresponding to the target window, merge the target window with the correlation window, and set the area size of the correlation window after the merge (that is, the area size of the correlation window after the adjustment the parameters are used) to be the combination of the area size of the target window and the original area size of the correlation window.

A task list corresponding to the correlation window is moved to the merged correlation window, and the separation bar between the target window and the correlation window is made invisible.

In some embodiments, the display screen of the mobile device may be divided. As shown in FIG. 7, window M may correspond to a main stage (MainStage), and window S and window T may be side stages (SideStage). Among the side stages, the window S may be a second stage (SecondStage), and the window T may be a third stage (ThirdStage). The priority of the main stage is the highest (highest importance), the priority of the side stage is lower than the main stage, and the priority of all side stages is the same.

For the closing operation (closing window S, i.e., closing a second stage), the parameters of the main stage are unchanged. The window manager closes the first task list corresponding to the second window, and merges window S and window T. The merged window is a side stage. If there are only two windows on the display screen, the merged side stages is a second stage.

In some embodiments, the task organizer controller moves the task list of window T to window S, deletes the separating bar between window T and window S, and hides window T.

In some embodiments, the task organizer controller may also update the display screen of the mobile device in response to a closing operation.

As such, in cases of multi-split screens (e.g., at least 3-split screens), when a target window is closed according to a closing operation, the area size and displayed content of the correlation window are adaptively adjusted according to embodiments of the present disclosure. The sizes of all windows of the multi-split screen are not affected, and the interactive interfaces corresponding to the dragged and swapped windows are also not affected. The usability of the split-screen and windows in the split-screen regions is improved, and the interaction is more efficient.

Figure 9:
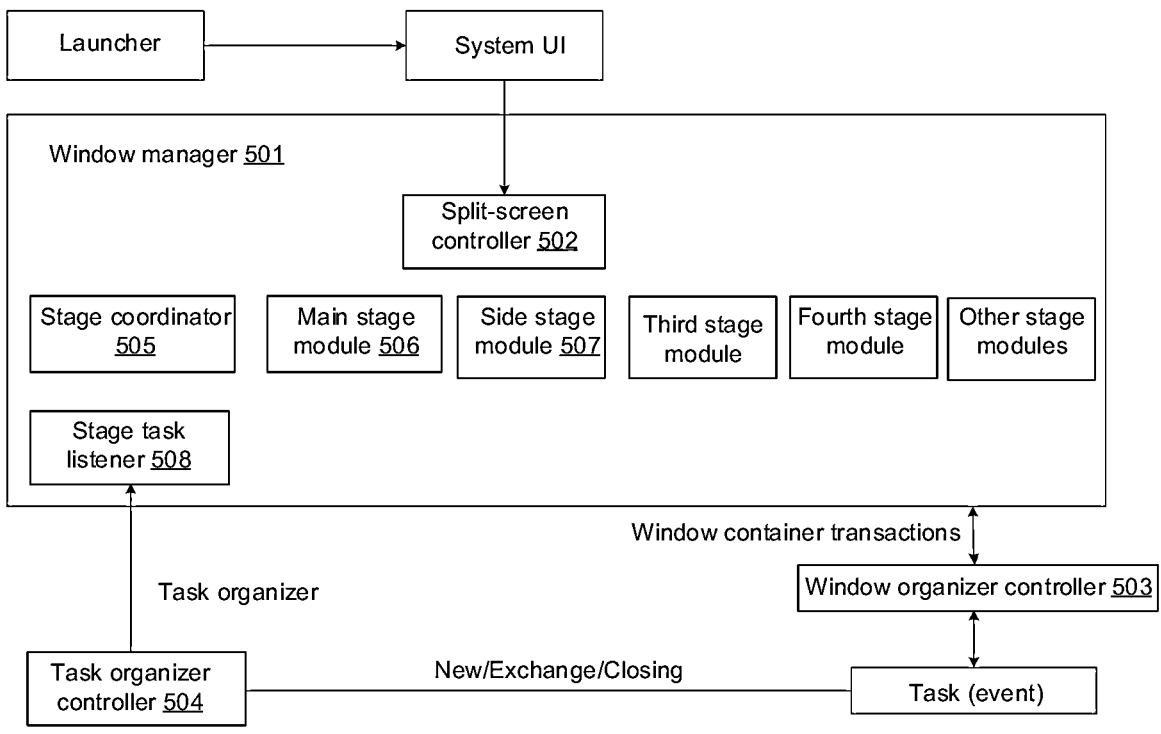
FIG. 9 illustrates a block diagram of an exemplary structure of a processing apparatus according to various embodiments of the present disclosure.

FIG. 9 shows a block diagram of an exemplary structure of a processing apparatus according to the present disclosure. In some embodiments, the processing apparatus may include a window manager 501, a split-screen controller 502, a window organizer controller 503, and a task organizer controller 504. The window manager 501 may include split-screen related modules such as the split-screen controller 502, a stage coordinator 505, a main stage module 506, a side stage module 507, and a stage task listener 508.

The split-screen controller 502 may receive an input operation sent from a system user interface (system UI), and send the input operation to the stage coordinator 505 included in the window manager 501, playing a linking role.

The stage coordinator 505 may manage the creation of various split-screen components and event sending and receiving.

The stage task listener 508 may receive tasks sent by the task organizer controller 504, and feedback the tasks to the main stage module 506 and side stage module 507.

The main stage module 506 and side stage module 507 are the basic split-screen components. Each module represents a split screen. In a multi-split screen, there is only one main stage, and there may be multiple side stages, all of which are subclasses of the stage task listener 508. The stage task listener 508 is a task receiver and receives split-screen related events from the framework (the structure of the processing apparatus). The side window module 507 may be expanded into a third stage module, a fourth stage module, and any other suitable stage modules, etc.

As aforementioned, the processing apparatus may include a task organizer controller 504. The task organizer controller 504 may be configured to register task listener. When a task changes, the current state is forwarded to a listener through the task listener. A task represents a task in the framework, and a split-screen interface here.

The stage coordinator 505 sends an input operation to the window organizer controller 503 in the form of window container transaction. The window organizer controller 503 receives split-screen related operations and operates on tasks in the framework, such as creating a task, changing the window boundary occupied by the task, deleting a task, etc.

The window manager 501 may display at least two windows in at least two split-screen regions based on a split-screen command. Each region of the at least two windows corresponds to a split-screen region of the at least two split-screen regions. Each of the at least two windows includes an interactive interface.

The split-screen controller 502 may obtain an input operation for a target window of the at least two windows.

The window organizer controller 503 may determine adjustment parameters of a correlation window associated with the target window among the at least two windows in response to an input operation.

The task organizer controller 504 may also be configured to adjust the correlation window based on the adjustment parameters. The correlation window before the adjustment is different from the correlation window after the adjustment.

The adjustment parameters may at least include the area size of the correlation window and the interactive interface included in the correlation window.

Optionally, the window manager 501 may determine the area size of the correlation window, in response to the input operation being to close the target window.

Optionally, the window manager 501 may obtain the area size of the target window and the original area size of the correlation window, and determine that the area size of the correlation window is the combination of the area size of the target window and the original area size of the correlation window.

Optionally, the window manager 501 may determine the interactive interface included in the correlation window, in response to the input operation being to drag the target window.

Optionally, the window manager 501 may confirm a target task corresponding to the target window, and determine that the interactive interface corresponding to the target task is the interactive interface of the correlation window.

Optionally, the window manager 501 may display at least two split-screen regions in response to the input operation being to drag the target window, and determine that a window corresponding to a target split-screen region is the correlation window in response to dragging the target window to the target split-screen region.

According to various embodiments, the present disclosure also provides an electronic device and a readable storage medium, for example, a non-transitory computer readable storage medium.

Figure 10:
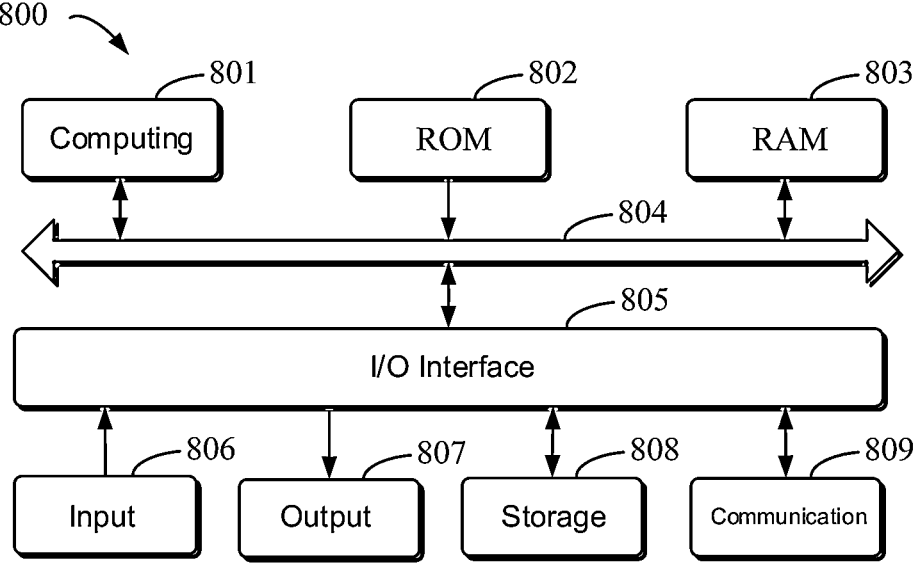
FIG. 10 illustrates a block diagram of an exemplary structure of an electronic device according to various embodiments of the present disclosure.

FIG. 10 shows a block diagram of an exemplary structure of an electronic device 800 according to the present disclosure. In some embodiments, the electronic device 800 may include various digital computers, such as laptops, desktops, workstations, personal digital assistants, servers, blade servers, mainframes, and other suitable computers. In other embodiments, the electronic device 800 may also include various mobile devices, such as personal digital processor, cellular phones, smart phones, wearable devices, and other similar computing devices. The components shown herein, their connections and relationships, and their functions are by way of example only, and are not intended to limit implementations of the disclosure described and/or claimed herein.

As shown in FIG. 10, the electronic device 800 may include a computing unit 801. The computing unit 801 may perform various appropriate actions and processes according to a computer program stored in a read-only memory (ROM) 802 or a computer program loaded from a storage unit 808 into a random-access memory (RAM) 803. Various programs and data necessary for the operation of the device 800 may be stored in the RAM 803. The computing unit 801, ROM 802, and RAM 803 may be connected to each other through a bus 804. Input/output (I/O) interface 805 is also connected to the bus 804.

Multiple components of the electronic device 800 may be connected to the I/O interface 805, including an input unit 806 (e.g., a keyboard, a mouse, etc.), an output unit 807 (e.g., various types of displays, speakers, etc.), a storage unit 808 (e.g., a magnetic disk, an optical disk, etc.), and a communication unit 809 (e.g., a network card, a modem, a wireless communication transceiver, etc.). The communication unit 809 may allow the device 800 to exchange information/data with other devices over a computer network such as the Internet and/or various telecommunication networks.

The computing unit 801 may be various general-purpose and/or special-purpose processing components with processing and computing capabilities. Some examples of the computing units 801 may include, but are not limited to, central processing units (CPUs), graphics processing units (GPUs), various dedicated artificial intelligence (AI) computing chips, various computing units that run machine learning model algorithms, digital signal processors (DSPs), and any suitable processors, controllers, microcontrollers, etc. The calculation unit 801 executes the various methods and processes described above, such as the processing method. For example, in some embodiments, the processing method may be implemented as a computer software program tangibly embodied on a machine-readable medium, such as the storage unit 808. In some embodiments, part or all of the computer programs may be loaded and/or installed at the electronic device 800 via the ROM 802 and/or the communication unit 809. When the computer program is loaded into the RAM 803 and executed by the computing unit 801, one or more steps of the processing method described above may be performed. Alternatively, in other embodiments, the computing unit 801 may be configured in any other appropriate way (for example, by means of firmware) to execute the processing method.

Various implementation methods of the systems and techniques described above may be implemented in digital electronic circuit systems, integrated circuit systems, field programmable gate arrays (FPGAs), application specific integrated circuits (ASICs), application specific standard products (ASSPs), system-on-chip (SOC), load programmable logic device (CPLD), computer hardware, firmware, software, and/or any combination. These various implementation methods may include being implemented in one or more computer programs. The one or more computer programs may be executed and/or interpreted at a programmable system having at least one programmable processor. The programmable processor may be a special purpose or general purpose programmable processor, receive data and instructions from a storage system, at least one input device, and at least one output device, and transmit data and instructions to the storage system, the at least one input device, and the at least one output device.

Program codes for implementing the methods of the present disclosure may be written in any combination of one or more programming languages. These program codes may be provided to a processor or controller of a general-purpose computer, a special purpose computer, or other programmable data processing devices. When these program codes are executed by a processor or controller, the functions and operations specified in the flowcharts and/or block diagrams are implemented. The program codes may be executed entirely at a machine, partly at a machine, or as a stand-alone software package partly at a machine and partly at a remote machine or entirely at a remote machine or server.

In the context of the present disclosure, the machine-readable medium may be a tangible medium that may contain or store programs for use by a command execution system, device, or equipment, or for use in conjunction with a command execution system, device, or equipment. The machine-readable medium may be a machine-readable signal medium or a machine-readable storage medium. The machine-readable medium may include, but is not limited to, an electronic, magnetic, optical, electromagnetic, infrared, or semiconductor system, apparatus, or equipment, or any suitable combination of the foregoing. More specific examples of the machine-readable storage media may include one or more wire-based electrical connections, portable computer discs, hard drives, random access memory (RAM), read-only memory (ROM), erasable programmable read-only memory (EPROM or flash memory), optical fiber, compact disk read-only memory (CD-ROM), optical storage device, magnetic storage device, or any suitable combination of the above.

To provide interaction with users, the systems and techniques described herein may be implemented on a computer. The computer contains a display device (for example, a cathode ray tube (CRT) or liquid crystal display (LCD) monitor) for displaying information to users, a keyboard, and a pointing device (for example, a mouse or trackball). A user may provide input to the computer through the keyboard and the pointing device. Other kinds of devices may also be used to provide interaction with a user. For example, the feedback provided to the user may be any form of sensory feedback (e.g., visual feedback, auditory feedback, or tactile feedback). Input from a user may be received in any form, including acoustic input, voice input, or tactile input.

The systems and techniques described herein may be implemented in a computing system that includes backend components (e.g., data servers), a computing system that includes middleware components (e.g., an application server), a computing system that includes front-end components (e.g., a user computer with a graphical user interface or web browser through which a user may interact with the implementations of the systems and techniques described herein), or a computing system of any combination of such back-end components, middleware components, and front-end components. The components of the system may be interconnected by any form or medium of digital data communication (e.g., a communication network). Examples of communication networks include local area networks (LANs), wide area networks (WANs), and the Internet.

In one embodiment, an exemplary electronic device may include one or more processors; and a memory coupled to the one or more processors and storing computer programs. When being executed, the computer programs may cause the one or more processors to implement the disclosed processing apparatus and perform the disclosed processing methods.

In one embodiment, a non-transitory computer readable storage medium may contain computer programs that, when being executed, cause one or more processors (e.g., of an electronic device) to implement the disclosed processing apparatus and perform the disclosed processing methods.

A computer system may include clients and servers. Clients and servers are generally away from each other and typically interact through a communication network. The relationship between the client and server is generated through computer programs running on the respective computers and having a client-server relationship to each other. The server may be a cloud server, a server of a distributed system, or a server combined with blockchain.

It should be understood that steps may be reordered, added, or removed using the various forms of flow shown above. For example, the steps described in the present disclosure may be executed in parallel, sequentially, or in a different order, as long as the desired result of the technical solution disclosed in the present disclosure may be achieved, and there is no limitation herein.

In addition, the terms "first" and "second" are used for descriptive purposes only, and cannot be interpreted as indicating or implying relative importance or implying the number of indicated technical features. Thus, features defined as "first" and "second" may explicitly or implicitly include at least one of these features. In the descriptions of the present disclosure, "plurality", "multi", and "multiple" each mean two or more, unless otherwise specifically defined.

The above are only specific embodiments of the present disclosure, but the protection scope of the present disclosure is not limited thereto. Anyone skilled in the art within the technical scope disclosed in this disclosure can easily think of changes or substitutions, which should be covered by the protection scope of this disclosure. Therefore, the protection scope of the present disclosure should be based on the protection scope of the claims.

What is claimed is:

1. A processing method, comprising:
   displaying, on a display screen of an electronic device, at least three windows in at least three split-screen regions based on a split-screen command, wherein a region of each of the at least three windows corresponds to a split-screen region of the at least three split-screen regions, and each of the at least three windows includes an interactive interface;
   obtaining a drag operation to drag a target window from a position of the target window in a first split-screen region of the at least three split-screen regions to a position of a correlation window in a second split-screen region of the at least three split-screen regions;
   in response to the drag operation, confirming, by a window manager, an area size of the target window and an area size of the correlation window, and establishing, by the window manager, a subtask to adjust the target window and the correlation window; and
   in response to the subtask, establishing, by a task organizer controller, a first task list corresponding to the target window and a second task list corresponding to the correlation window, moving, by the task organizer controller, the first task list to the correlation window, and moving, by the task organizer controller, the second task list to the target window.

2. The method according to claim 1, further comprising:
in response to a closing operation for closing the target window, determining the area size of the correlation window.

3. The method according to claim 2, wherein determining the area size of the correlation window includes:
obtaining the area size of the target window and an original area size of the correlation window, and
determining that the area size of the correlation window is a combination of the area size of the target window and the original area size of the correlation window.

4. The method according to claim 1, wherein displaying the at least three windows in the at least three split-screen regions based on the split-screen command includes displaying four windows in four split-screen regions respectively based on the split-screen command.

5. The method according to claim 1, further comprising:
adjusting the correlation window based on adjustment parameters, including:
in response to the drag operation, moving the interactive interface included in the target window from the position of the target window in the first split-screen region to the position of the correlation window in the second split-screen region, and moving the interactive interface included in the correlation window from the position of the correlation window in the second split-screen region to the position of the target window in the first split-screen region, wherein one or more windows of the at least three windows other than the target window and the correlation window remain unchanged, and a size and a position of each of the at least three split-screen regions remain unchanged in response to the drag operation.

6. The method according to claim 5, wherein the adjustment parameters at least include:
the area size of the correlation window; and
the interactive interface included in the correlation window.

7. The method according to claim 1, wherein a size of the first split-screen region is different from a size of the second split-screen region, the area size of the target window is different from the area size of the correlation window, and the area size of the target window and the area size of the correlation window remain unchanged in response to the drag operation.

8. A processing apparatus, comprising:
a processor configured to execute instructions stored in a memory to at least:
display, through a window manager and on a display screen of the processing apparatus, at least three windows in at least three split-screen regions based on a split-screen command, a region of each of the at least three windows corresponding to a split-screen region of the at least three split-screen regions, and each of the at least three windows including an interactive interface;
obtain, through a split-screen controller, a drag operation for a target window among the at least three windows to drag the target window from a position of the target window in a first split-screen region of the at least three split-screen regions to a position of a correlation window in a second split-screen region of the at least three split-screen regions;
in response to the drag operation, confirm, through a window organize controller, an area size of the target window and an area size of the correlation window, and establish a subtask to adjust the target window and the correlation window to the boundaries; and
in response to the subtask, establish, through a task organizer controller, a first task list corresponding to the target window and a second task list corresponding to the correlation window, move the first task list to the correlation window, and move the second task list to the target window.

9. The apparatus according to claim 8, wherein:
the window manager is further configured to perform:
determining the area size of the correlation window in response to a closing operation for closing the target window.

10. The apparatus according to claim 9, wherein the window manager is further configured to perform:
obtaining the area size of the target window and an original area size of the correlation window, and
determining that the area size of the correlation window is a combination of the area size of the target window and the original area size of the correlation window.

11. The apparatus according to claim 8, wherein:
the task organizer controller is further configured to:
adjust the correlation window based on adjustment parameters, including:
in response to the drag operation, moving the interactive interface included in the target window from the position of the target window in the first split-screen region to the position of the correlation window in the second split-screen region, and moving the interactive interface included in the correlation window from the position of the correlation window in the second split-screen region to the position of the target window in the first split-screen region, wherein one or more windows of the at least three windows other than the target window and the correlation window remain unchanged, and a size and a position of each of the at least three split-screen regions remain unchanged in response to the drag operation.

12. The apparatus according to claim 11, wherein the adjustment parameters at least include:
the area size of the correlation window; and
the interactive interface included in the correlation window.

13. An electronic device, comprising:
one or more processors; and
a memory coupled to the one or more processors and storing computer programs that, when being executed, cause the one or more processors to perform:
displaying, on a display screen of the electronic device, at least two windows in at least three split-screen regions based on a split-screen command, wherein a region of each of the at least three windows corresponds to a split-screen region of the at least three split-screen regions, and each of the at least three windows includes an interactive interface;
obtaining a drag operation to drag a target window from a position of the target window in a first split-screen region of the at least three split-screen regions to a position of a correlation window in a second split-screen region of the at least three split-screen regions;
in response to the drag operation, confirming, by a window manager, an area size of the target window and an area size of the correlation window, and establishing, by the window manager, a subtask to adjust the target window and the correlation window; and in response to the subtask, establishing, by a task organizer controller, a first task list corresponding to the target window and a second task list corresponding to the correlation window, moving, by the task organizer controller, the first task list to the correlation window, and moving, by the task organizer controller, the second task list to the target window.

14. The electronic device according to claim 13, wherein:

the one or more processors are further configured to perform:

in response to a closing operation for closing the target window, determining the area size of the correlation window.

15. The electronic device according to claim 14, wherein the one or more processors are further configured to perform:

obtaining the area size of the target window and an original area size of the correlation window, and determining that the area size of the correlation window is a combination of the area size of the target window and the original area size of the correlation window.

16. The electronic device according to claim 13, wherein the one or more processors are further configured to perform:

adjusting the correlation window based on adjustment parameters, including:

in response to the drag operation, moving the interactive interface included in the target window from the position of the target window in the first split-screen region to the position of the correlation window in the second split-screen region, and moving the interactive interface included in the correlation window from the position of the correlation window in the second split-screen region to the position of the target window in the first split-screen region, wherein one or more windows of the at least three windows other than the target window and the correlation window remain unchanged, and a size and a position of each of the at least three split-screen regions remain unchanged in response to the drag operation.

17. The electronic device according to claim 16, wherein the adjustment parameters at least include:

the area size of the correlation window; and the interactive interface included in the correlation window.

* * * * *